United States Patent [19]
Diamond et al.

[11] Patent Number: 5,162,659
[45] Date of Patent: Nov. 10, 1992

[54] METHOD AND APPARATUS FOR NONCONTACT INSPECTION OF ENGINE BLADES

[75] Inventors: Edward M. Diamond, Ellenwood; David M. Free, Fayetteville, both of Ga.

[73] Assignee: Northwest Airlines, Inc., Eagan, Minn.

[21] Appl. No.: 665,946

[22] Filed: Mar. 6, 1991

[51] Int. Cl.[5] ............................................. G01N 21/86
[52] U.S. Cl. ..................................... 250/560; 356/376
[58] Field of Search ....................... 250/560, 562, 563; 356/237, 376, 386, 387

[56] References Cited

U.S. PATENT DOCUMENTS

| | | | |
|---|---|---|---|
| 3,894,802 | 7/1975 | Higgins | 356/376 |
| 4,183,672 | 1/1980 | Raber et al. | 356/376 |
| 4,467,214 | 8/1984 | Ito et al. | 250/563 |
| 5,026,165 | 6/1991 | Faville | 356/386 |

Primary Examiner—David C. Nelms
Assistant Examiner—K. Shami
Attorney, Agent, or Firm—Dorsey & Whitney

[57] ABSTRACT

A laser scanning device is employed in conjunction with a unique blade mounting assembly to provide for the noncontact inspection of turbojet engine blades. The laser scanner provides a stationary laser scanning beam. The blade mounting assembly includes an elevation control assembly and a rotatable table for shifting a turbojet engine blade through the laser beam along both axial and rotational axes. A universal adaptor assembly is provided to allow for the attachment of a variety of turbojet engine blade types and sizes to the blade mounting assembly. The method of inspecting turbojet engine blades includes the steps of providing an energy beam, shifting the blade to be inspected through the beam along both axial and angular axes, determining the blade chord width and twist from the measured beam blockage, and visually marking the substandard portions of the blade.

18 Claims, 15 Drawing Sheets

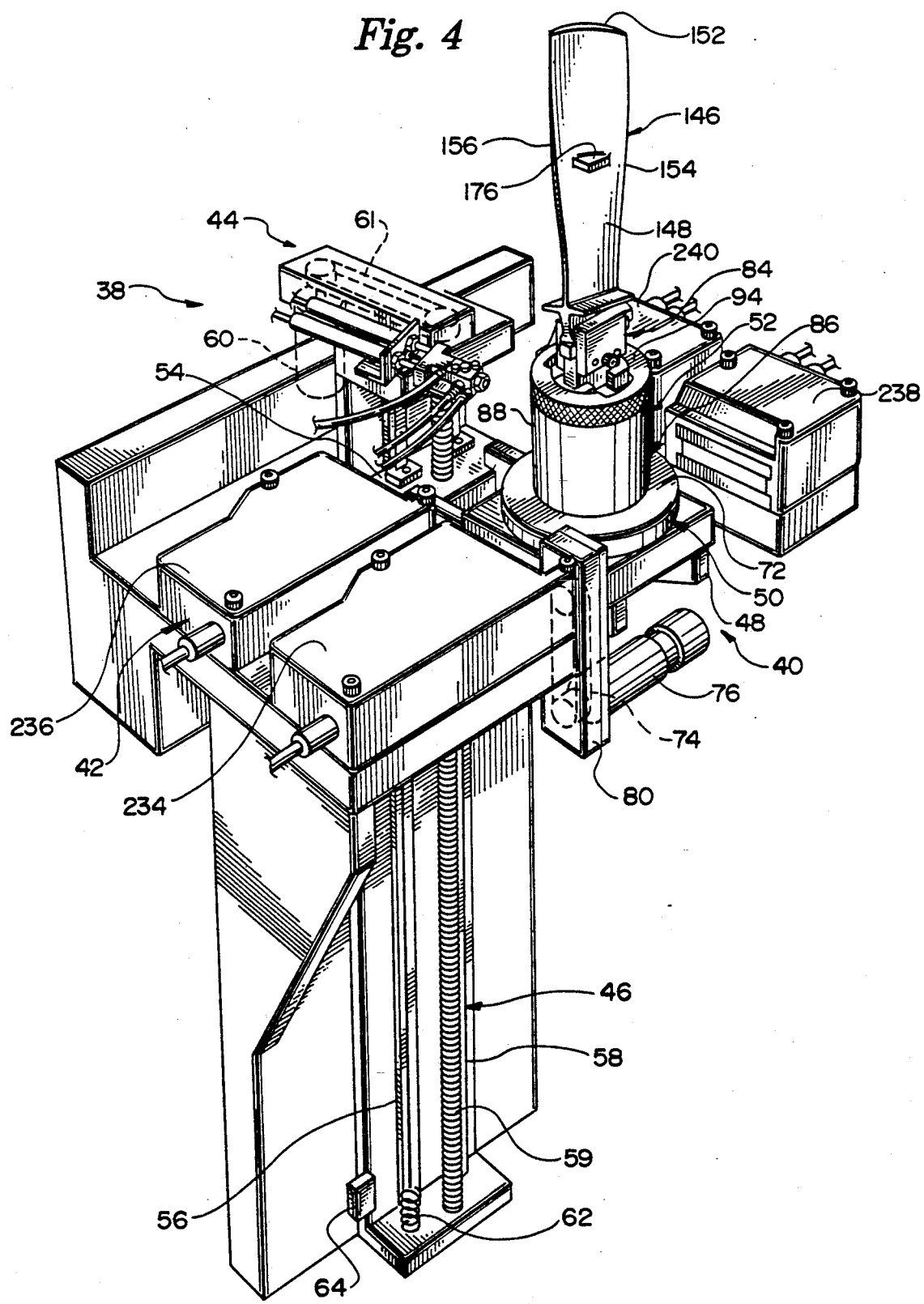

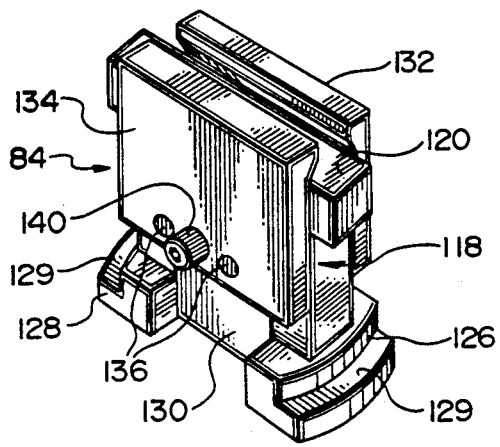
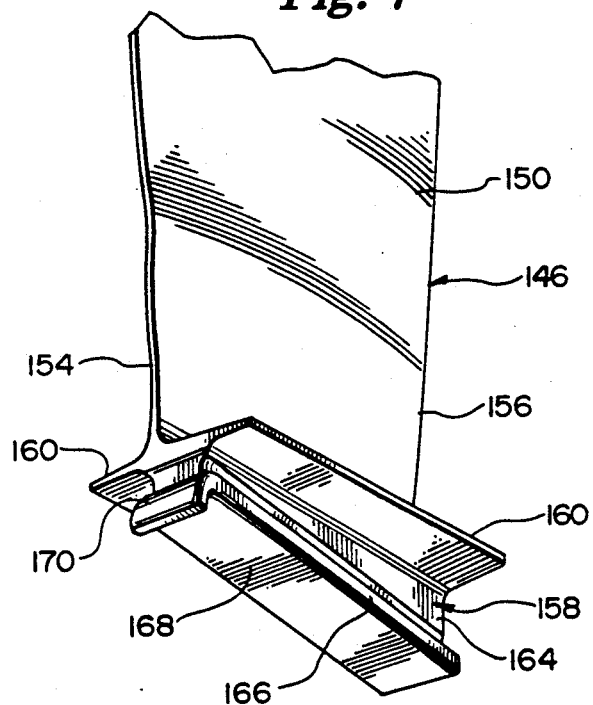
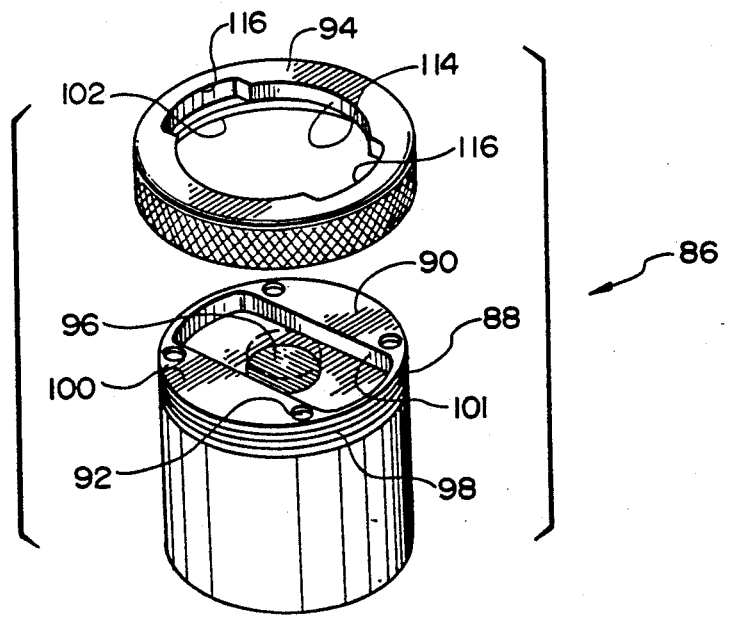

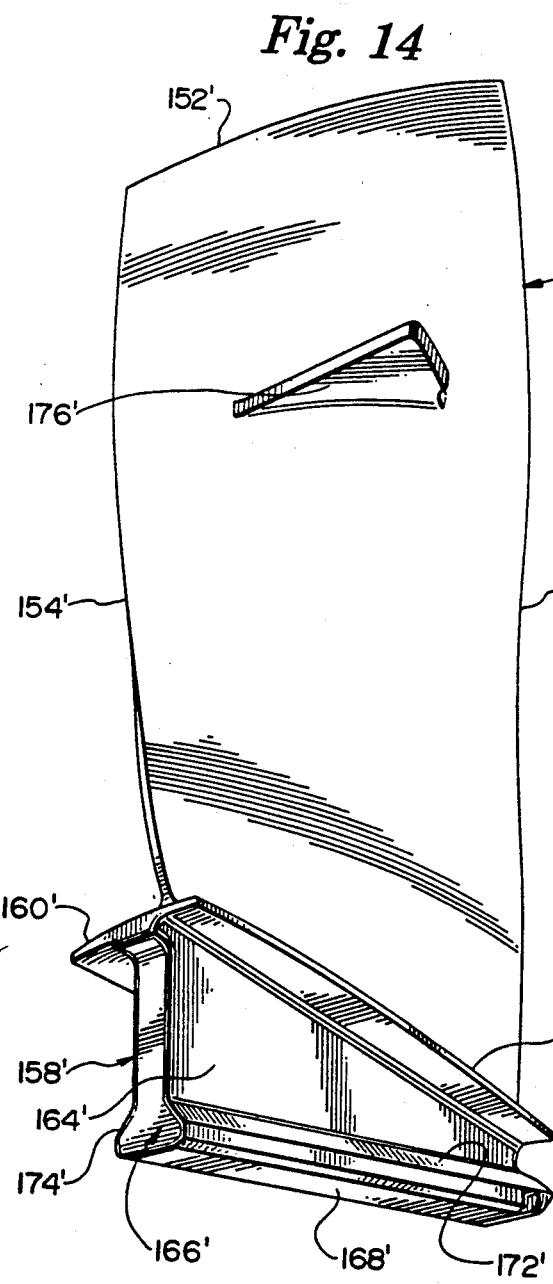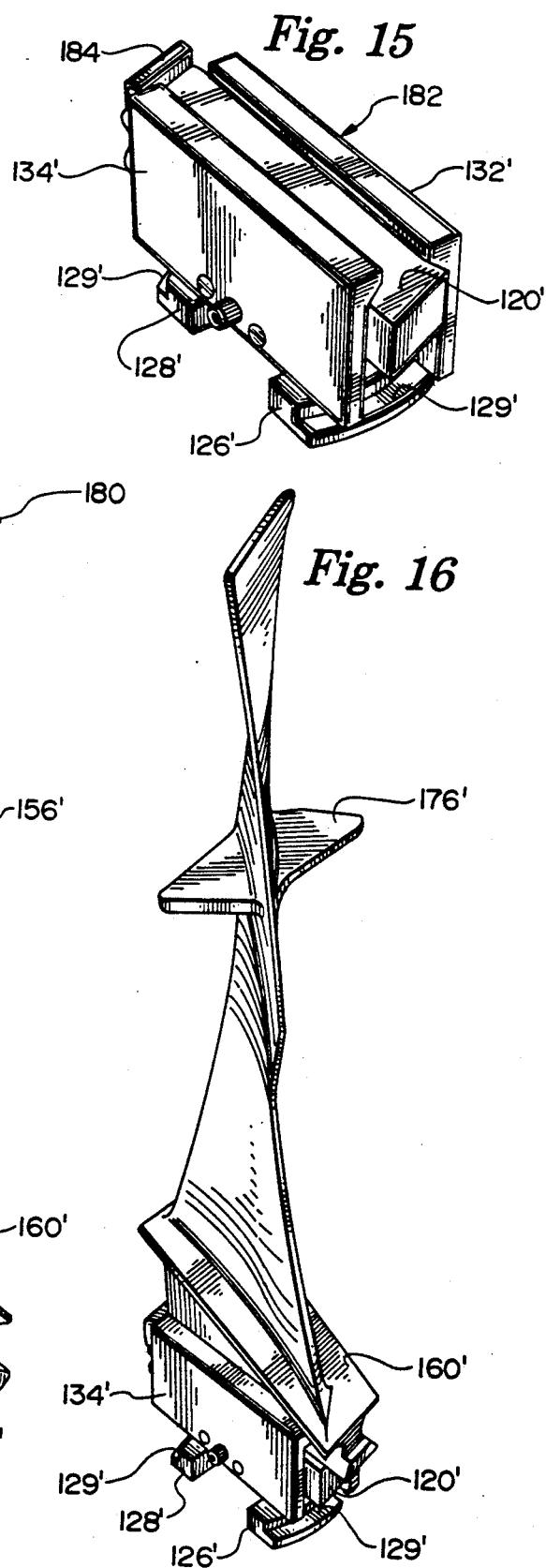

METHOD AND APPARATUS FOR NONCONTACT INSPECTION OF ENGINE BLADES

TECHNICAL FIELD

The disclosed invention relates to the field of turbojet engine maintenance. In particular, it relates to a method and apparatus for inspecting the individual blades of the compressor and turbine stages of turbojet engines.

BACKGROUND ART

Jet aircraft and modern naval vessels are commonly powered by turbojet engines. Such engines operate on the principal of accelerating a small mass of gas to a high velocity, thereby producing a reaction required to push the craft forward. The basic requirements of producing the motive reaction include compressing an air charge, burning fuel within the compressed air, and exhausting the hot gases through a nozzle. The basic components of a turbojet engine include an air inlet (or diffuser), compressor stages where the inlet gases are compressed, a combustor where the fuel is burned, a turbine for providing rotative power to the compressor, and the outlet nozzle. The exiting of the hot gases from the combustor through the turbine provides the turning force to the turbine for turning the compressor stages.

Axial-flow compressors are used on nearly all turbojet, turbofan, and turboprop engines for aircraft. Axial flow compressors are made up of several "stages", with each stage being made up of a row of rotating blades (rotor) and a row of stationary blades (stator). The blades are detachably carried by blade carrying hubs, and can be individually removed upon disassembly of the engine for inspection. The stator blades decelerate the air, increase the air static pressure, and direct the air at the proper angle into the succeeding row of rotor blades. As the air passes from each stage, the pressure and temperature of the air are increased. The heat of combustion is added in the burner section of the engine.

The turbine wheel, similar to the compressor stages, is comprised of a number of individual blades that are keyed or slot mounted to a turbine hub. The turbine blades are exposed to extreme temperatures of between 1600° and 2400° F. It will be appreciated that both the turbine blades and compressor blades are subjected to extremely high stresses due to centrifugal and axial loads.

The efficiencies at which the turbine and compressor operate are very important to the overall thrust output of the engine. In particular, approximately two-thirds of the energy available in the hot gases produced in the combustor is absorbed by the turbine to drive the compressor. The material integrity of the compressor blades and turbine blades is accordingly critical to turbojet engine performance. As the blades deteriorate due to thermal wear, centrifugal stresses, and ingestion by the engine of foreign objects, less air is input and compressed in the engine, causing the engine to drop in fuel efficiency and to lose power. In the extreme, blade wear can cause engine failure.

The Federal Aviation Administration (FAA) has established requirements for the inspection of turbojet engine blades. The requirements mandate the inspection of the blades after a specified number of hours of operation of the engine. The requirements also set out the criteria by which a blade can be determined to be serviceable or nonserviceable. Conventional inspection methods include the use of plastic templates that fit over the blade for comparison of the blade to dimensions indicated on the template. In addition, mechanical calipers are used to measure various dimensions on the blade. Contact or mechanical gauging techniques, such as the use of calipers and templates, however, are susceptible to wear of the gauging device and resultant loss of accuracy over time. Moreover, such techniques require operator skill, are time intensive, are dependent on visual inspection, and are incapable of providing a direct input to a recording system.

Another problem that has been identified in conjunction with the contact or mechanical inspection of turbojet engine blades is the excessively high reject rate of serviceable blades. As many as 30–35% of blades initially rejected by the use of visual, contact mechanical gauging procedures have been found to be falsely rejected. Individual blades can cost from between $1,600 to $10,000 per blade, depending on the size of the engine the blade pertains to. With as many as 40 to 50 blades per stage, the cost of a high blade reject rate can quickly become prohibitive.

SUMMARY OF THE INVENTION

The problems outlined above are in large measure solved by the method and apparatus for noncontact turbojet engine blade inspection in accordance with the present invention.

A laser scanning device is employed in conjunction with a unique blade mounting assembly and operating software to provide for the measurement of blade dimensions without the use of templates or mechanical gauging devices. A touch screen monitor provides for convenient operator interface with the inspection apparatus.

The laser scanning apparatus provides a stationary laser scanning beam. The blade mounting assembly includes an elevation control assembly and a rotatable table for shifting a mounted blade through the laser beam along both axial and rotational axes. A unique blade engaging assembly includes a universal adapter assembly and a variety of detachable blade gripper assemblies to allow for the mounting of a variety of conventional turbojet engine blade types and sizes. A paint marking gun is included for providing a visual mark on inspected blades to indicate areas of unacceptable wear.

The method of scanning turbojet engine blades in accordance with the present invention includes the steps of providing a stationary laser scanning beam, moving a blade to be inspected through the beam in a preprogrammed path along both axial and angular axes, determining the widest area of laser beam blockage at specified chords on the blade, comparing the determined chord width to standard blade width and twist parameters, and visually marking the substandard portions of the blade.

BRIEF DESCRIPTION OF THE DRAWINGS

FIG. 4 is a perspective view of the apparatus with cabinet and support structures removed for clarity, and depicting the blade in the position of FIG. 3;

FIG. 5 is a perspective, detailed view of a blade gripper assembly designed to receive a blade of the type depicted in FIG. 7;

FIG. 6 is an exploded view of the adapter assembly for receiving the gripper assembly;

FIG. 7 is a fragmentary, perspective view of a first type of a turbojet engine blade;

FIG. 11a is a fragmentary view of a blade within the laser scanning beam;

FIG. 14 is a perspective view of a second type of turbojet engine blade;

FIG. 15 is a perspective view of a second blade gripper assembly designed to receive the blade of FIG. 14;

FIG. 16 is a perspective view of the blade depicted in FIG. 14 received by the blade gripper assembly of FIG. 15;

DETAILED DESCRIPTION OF THE DRAWINGS

Figure 1:
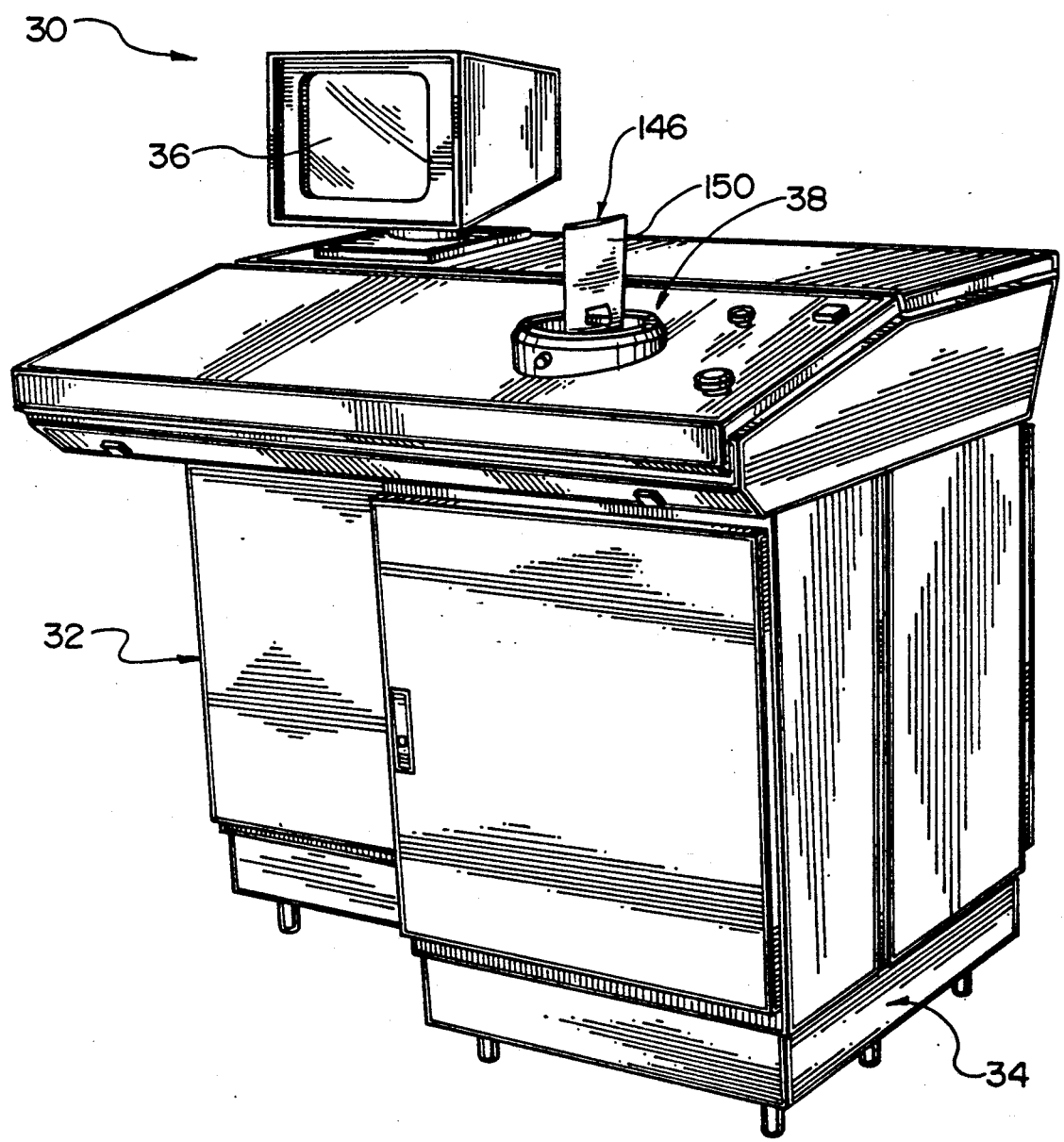
FIG. 1 is a perspective view of the apparatus for inspecting turbojet engine blades in accordance with the present invention.

Referring to the drawings, the apparatus 30 for inspecting turbojet engine blades in accordance with the present invention broadly includes cabinet 32 carried by frame 34, touch screen monitor and central processing unit 36, and blade inspection assembly 38. Referring to FIG. 4, the blade inspection assembly 38 broadly includes blade mounting assembly 40, laser scanner assembly 42 and paint marker 44.

Blade mounting assembly 40 includes elevation control assembly 46, support mount 48, worm driven rotational stage 50, and blade engaging assembly 52. The elevation control assembly includes carrier block 54 slidably carried by parallel tracks 56, 58 rotatable ball screw 59, elevation drive motor 60 and sprocket drive chain 61. Bottom out spring 62 is engageable with carrier block 54 at the lowermost portion of the carrier block's path of travel. Lower limit position sensor 64, upper limit sensor 66, and emergency stop position sensor 68 are positioned along the path of travel of carrier block 54 along the parallel tracks 56, 58.

Support mount 48 is fixedly attached to carrier block 54 by locking nuts 70. Rotational stage 50 comprises a rotary positioning table 72 such as the 20000 Series rotary table manufactured by Daedal Positioning Systems and Control. The rotary table 72 includes a precision worm gear drive that is actuated by sprocket drive chain 74, and driven by rotation motor 76. Magnetic sensor 78 is carried by sprocket housing 80 for angular registration of the rotary table 72.

Blade engaging assembly 52 is rotatably carried by the rotary table 72. The blade engaging assembly 52 includes detachable gripper assembly 84 and adaptor assembly 86.

Figure 8:
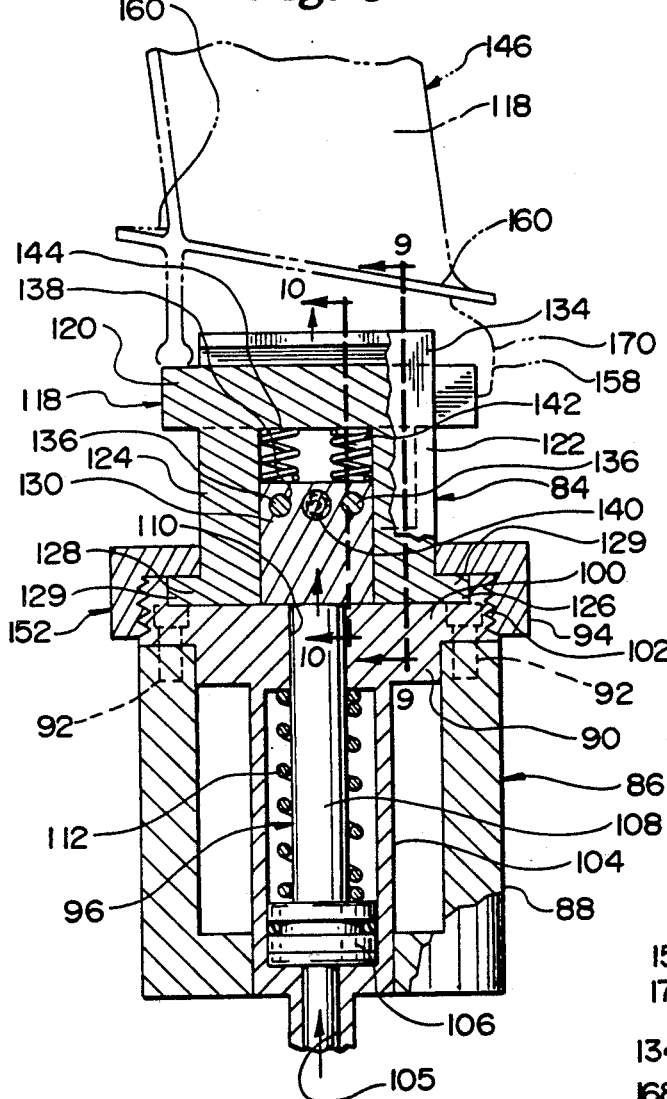
FIG. 8 is a fragmentary, side elevational view of the blade engaging assembly, with parts cut away to depict the internal mechanism of the assembly.

Referring to FIG. 8, adaptor assembly 86 includes support canister 88 fixedly attached to the rotary table 72, adaptor head 90 secured to the canister by attachment bolts 92, locking ring 94, and air actuated piston 96. Adaptor head 90 includes external threads 98 along the outer periphery of cap portion 100 for mating with internal threads 102 of locking ring 94. Adaptor head cylinder portion 104 is detachably carried by the cap portion 100. Gripper assembly base portion receiving cavity 101 is presented by the upper face of cap portion 100. Piston 96 includes piston head 106 carried within the cylinder portion 104 and piston rod 108 received through a central aperture 110 in cap portion 100. Compression spring 112 biases the piston head downwardly within the cylinder portion 104. Air channel 105 allows for the selective introduction of actuating air into the cylinder portion 104.

Figure 18:
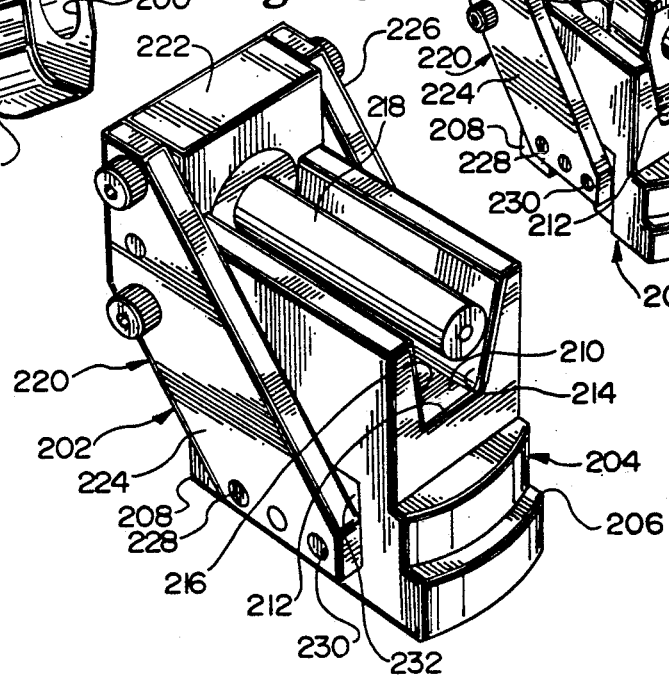
FIG. 18 is a perspective view of a third blade gripper assembly designed to receive the blade of FIG. 17.

Referring to FIG. 6, locking ring 94 includes central aperture 114 having opposed key ways 116. Referring to FIGS. 5, 15, and 18, it will be seen that each of the three embodiments of detachable gripper assemblies include keys receivable within the opposed key ways 116 of the locking ring 94 of adaptor head 90. The outer peripheral edge of locking ring 94 is knurled to facilitate rotation of the locking ring by hand.

Detachable gripper assembly 84 is depicted in FIGS. 5 and 8-10. The gripper assembly 84 includes T-bar 118 having an uppermost, horizontal blade foot engaging bar 120 and opposed, downwardly depending, vertically oriented support standards 122, 124. Each of the support standards 122, 124 terminate at a respective lowermost pedestal 126, 128. Pedestals 126, 128 each include a stepped key 129 receivable within the key ways 116 of locking ring 94.

Figure 10:
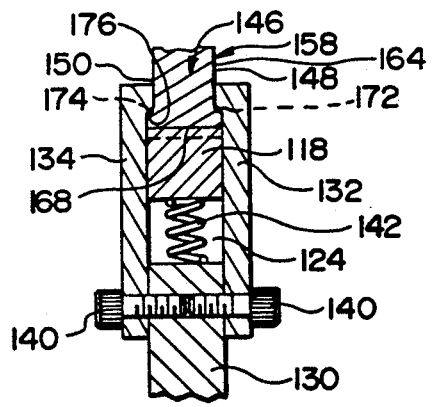
FIG. 10 is a fragmentary, sectional view taken along the line 10—10 of FIG. 8.

Pusher block 130 is slidably received between the support standards 122, 124. Opposed gripper jaws 132, 134 are fixedly carried by the pusher block 130. Registration pins 136 extend inwardly from each of the gripper jaws 132, 134 and are received within registration channels 138 bored through the pusher block 130. A socket head cap screw 140 is received through each gripper jaw 132, 134 for attachment of the respective gripper jaw 132, 134 to the pusher block 130. Referring to FIGS. 8 and 10, a pair of opposed compression springs 142, 144 provide a downward bias to the pusher block 130 relative to the horizontal bar 120 of T-bar 118.

Figure 2:
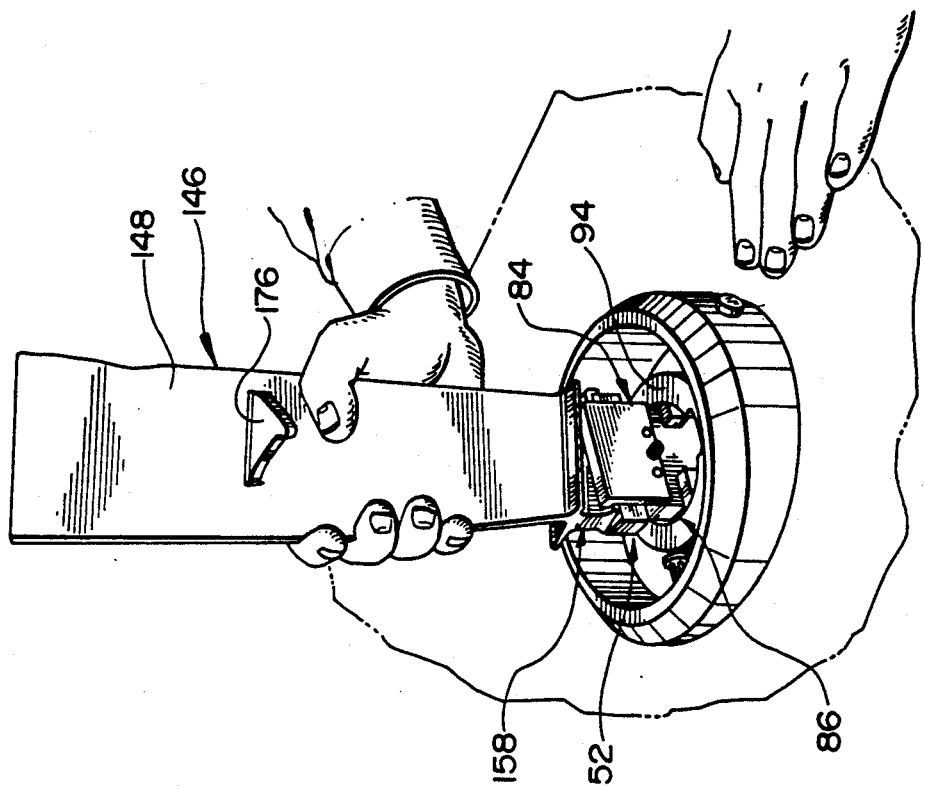
FIG. 2 is a fragmentary, perspective view of the apparatus depicting a blade being manually oriented for insertion into the blade mounting assembly.
Figure 3:
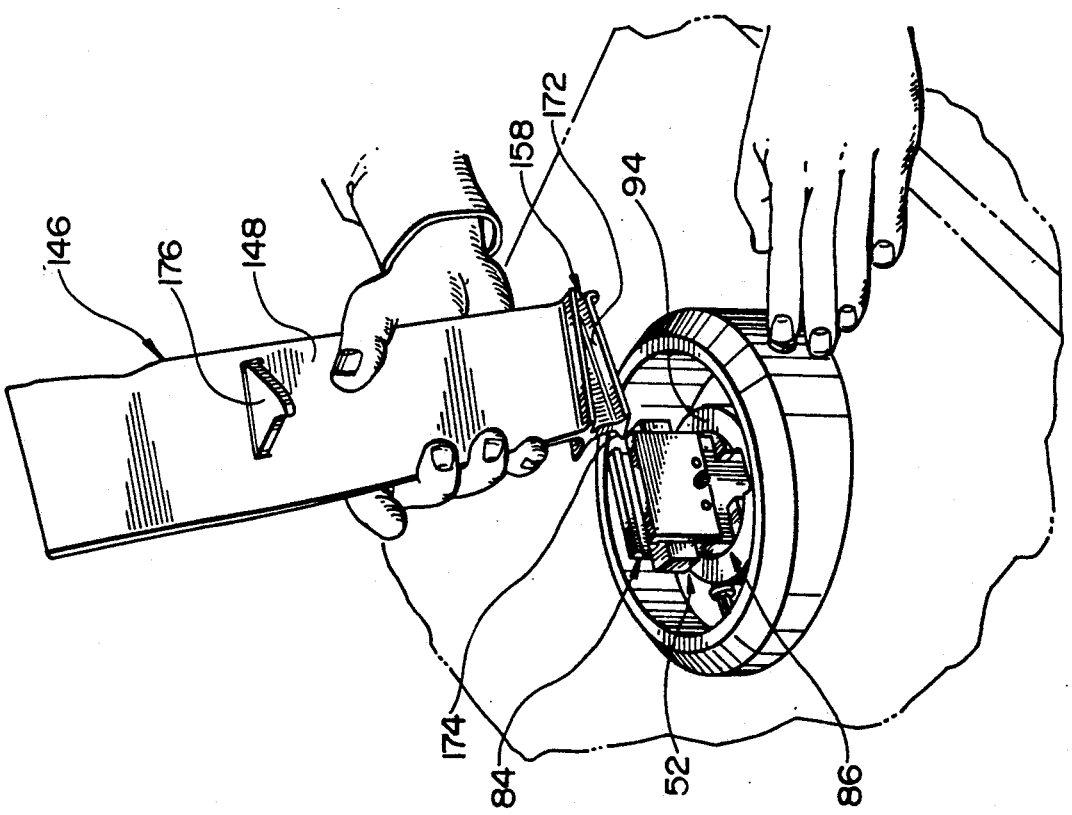
FIG. 3 is similar to FIG. 2 but with the blade fully mounted.
Figure 9:
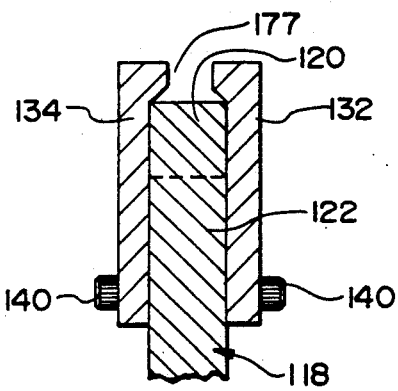
FIG. 9 is a fragmentary, sectional view taken along the line 9—9 of FIG. 8.

A turbojet engine blade 146 engageable by the gripper assembly 84 is depicted in FIGS. 2, 3 and 7. The blade 146 includes forward and rear blade faces 148, 150, blade tip peripheral edge 152, opposed blade side margins 154, 156, and blade root 158. The blade root includes opposed, outwardly extending root flanges 160, 162, downwardly depending root web 164, and root base 166. The root base 166 includes lower face 168 and downwardly depending stop 170. Referring to FIGS. 2 and 10, the upper face of root base 166 includes beveled surfaces 172, 174. The blade 146 also includes opposed abutment segments 176 that provide for the proper stacking of a plurality of blades 146 when the blades are assembled together on a central hub to form a compressor or turbine stage of a turbojet engine. Referring to FIGS. 9 and 10, it will be seen that the gripping channel 177 as defined by the gripper jaws 132, 134 and horizontal bar 120 of T-bar 118 is configured in a complementary fit to the profile presented by the blade root 158.

A second type of a turbojet engine blade 180 is depicted in FIG. 14. The blade 180 is similar in many respects to the blade 146 depicted in FIGS. 2, 3 and 7 and described above. Similar elements between the blades 146 and 180 are accordingly annotated with like numbers, but with the second blade numbers being annotated with a prime ('). The blade 180, however, does not include a depending stop on the blade root as is the case with the blade 146. A second gripping assembly 182 is accordingly provided and depicted in FIG. 15. The gripping assembly 182 includes several elements similar to the gripper assembly 84, and like parts are annotated with similar, but primed, numbers. The gripper assembly 182 differs from the previously described gripper assembly 84 in that it includes an upwardly extending stop wall 184.

Figure 17:
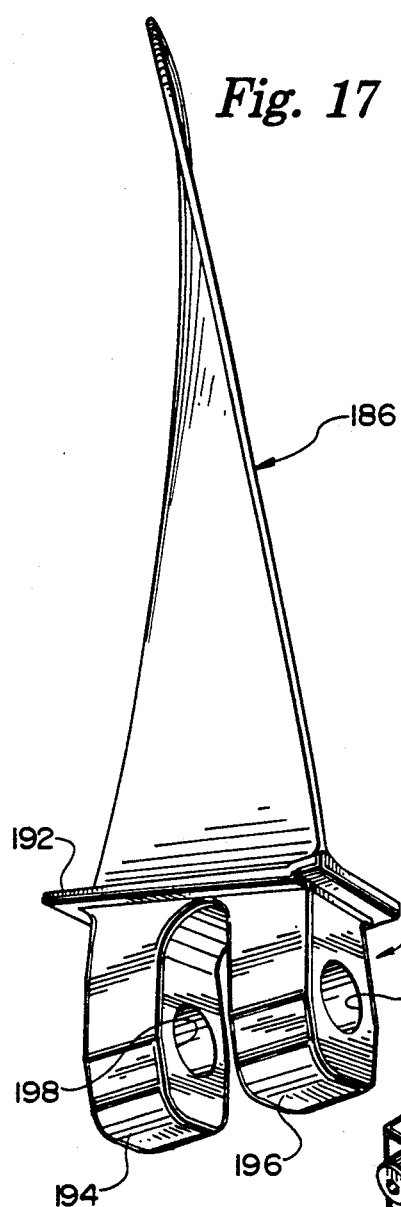
FIG. 17 is a perspective view of a third type of turbojet engine blade.
Figure 19:
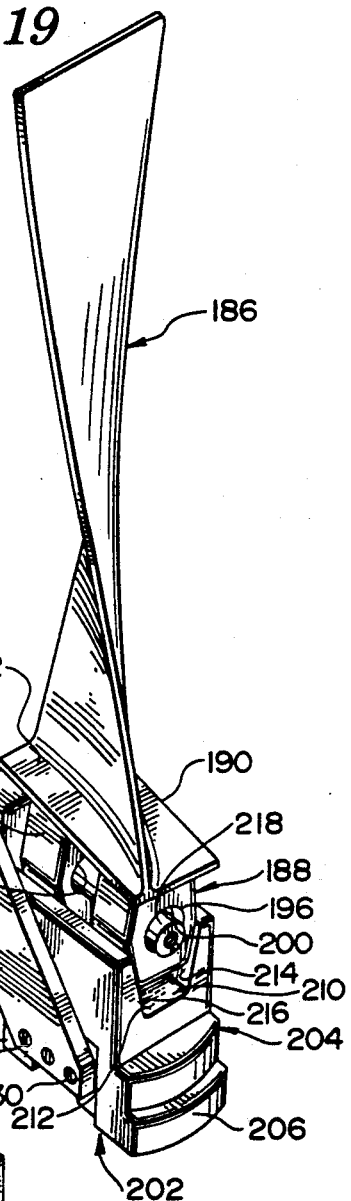
FIG. 19 is a perspective view of the blade depicted in FIG. 17 received by the blade gripper assembly of FIG. 18.

A third type of turbojet engine blade 186 is depicted in FIGS. 17 and 19. The blade 186 includes a substantially different root design from that depicted and described in conjunction with blade 146 and blade 180. The root 188 of blade 186 includes outwardly extending root flanges 190, 192, and first and second feet 194, 196. The feet 194, 196 include aligned anchor pin receiving channels 198, 200, respectively.

The third gripper assembly 202 is designed to receive the third type of blade 186. The gripper assembly 202 includes base member 204 having lowermost keys 206, 208 receivable within the key ways 116 of locking ring 94. The upper portion of base member 204 comprises a blade root receiving cradle 210. The cradle 210 includes horizontal face 212 and upwardly, outwardly tapered opposed faces 214, 216.

Blade foot engaging rod 218 is shiftably carried relative to the blade root receiving cradle 210 by shiftable carriage 220. Carriage 220 includes vertically oriented base block 222 and opposed diagonal links 224, 226. The diagonal links 224, 226 are connected together by connecting pins 228, 230 received through connecting pin channel 232 on the lower face of base member 204.

Figure 11:
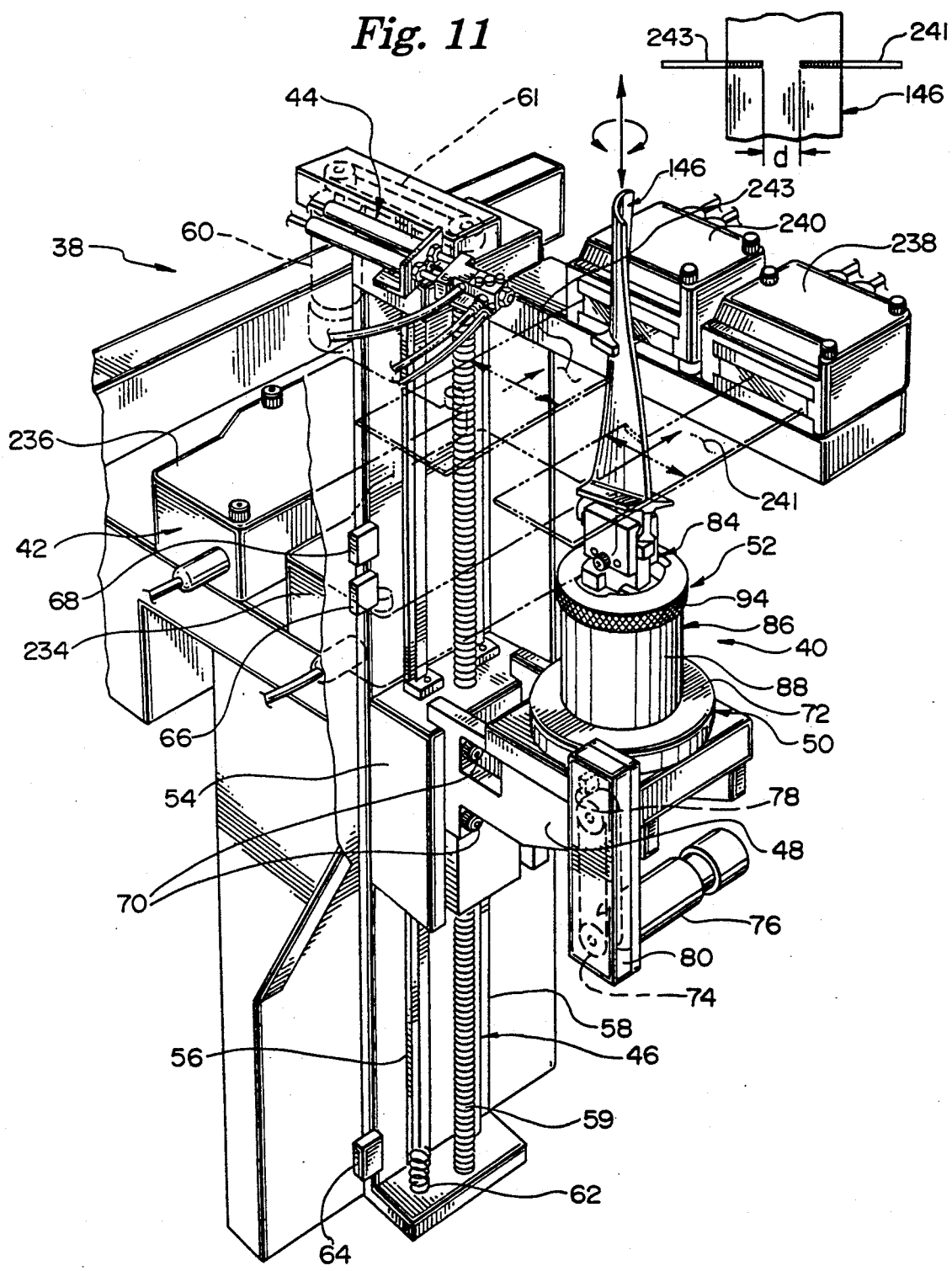
FIG. 11 is a fragmentary, perspective view similar to that of FIG. 4, but with the blade in position for scanning.

Laser scanner assembly 42 includes side by side laser scanner transmitters 234, 236, and laser scanner receivers 238, 240 such as the Visible Laser Scan Micrometer marketed by the Keyence Corporation of America, Fair Lawn, N.J. Referring to FIGS. 11 and 11a, the laser scan transmitters 234, 236 provide a pair of side by side generally planar laser beam profiles 241, 243, that are separated by a fixed distance d. It will be appreciated that a single scanning beam could be provided, but that commonly available commercial laser scanners do not have a beam width as wide as the width of most turbojet engine blades.

Figure 12:
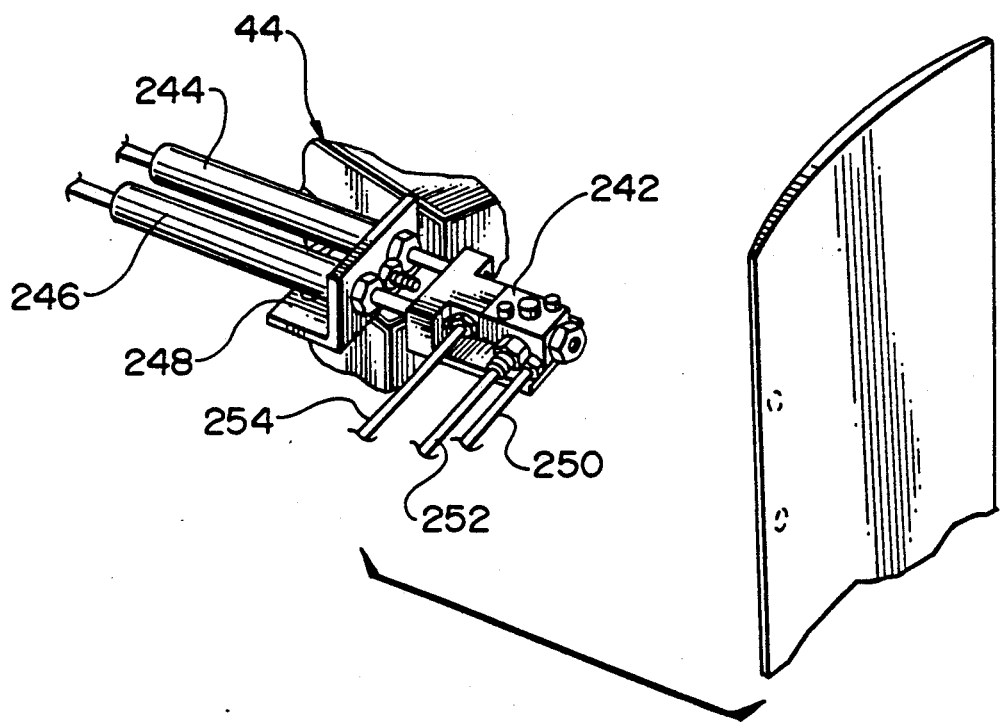
FIG. 12 is a fragmentary view of the apparatus depicting a blade and the blade marking assembly.
Figure 13:
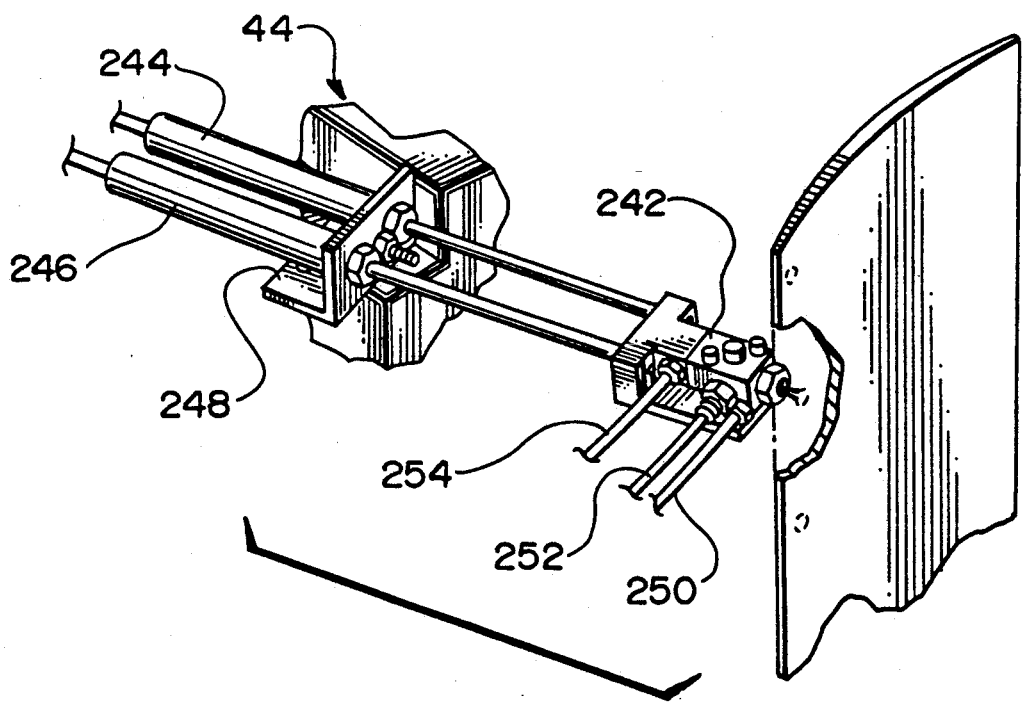
FIG. 13 is a similar to FIG. 12 but with the blade marking assembly in the marking position.

Referring to FIGS. 12 and 13, paint marker assembly 44 includes paint nozzle 242, side by side nozzle extending piston and cylinder assemblies 244, 246, piston support base 248, and paint supply line 250. Paint supply line 250 provides an input stream of paint to the paint nozzle 242. Pneumatic supply line 252 and return line 254 provide a supply of operating air to the nozzle 242.

Figure 20:
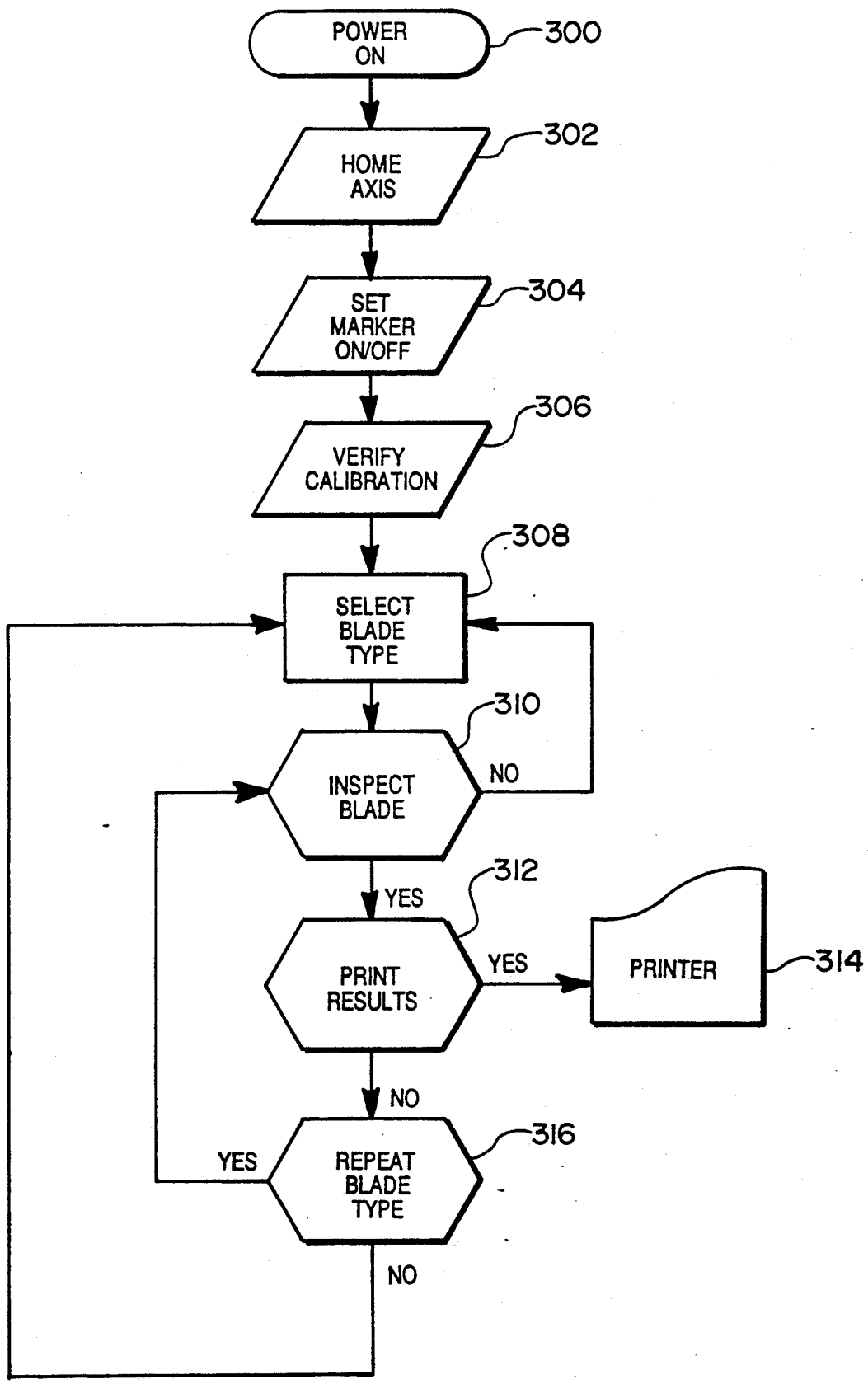
FIG. 20 is a flow diagram depicting the overall operation of the blade inspection apparatus.
Figure 21:
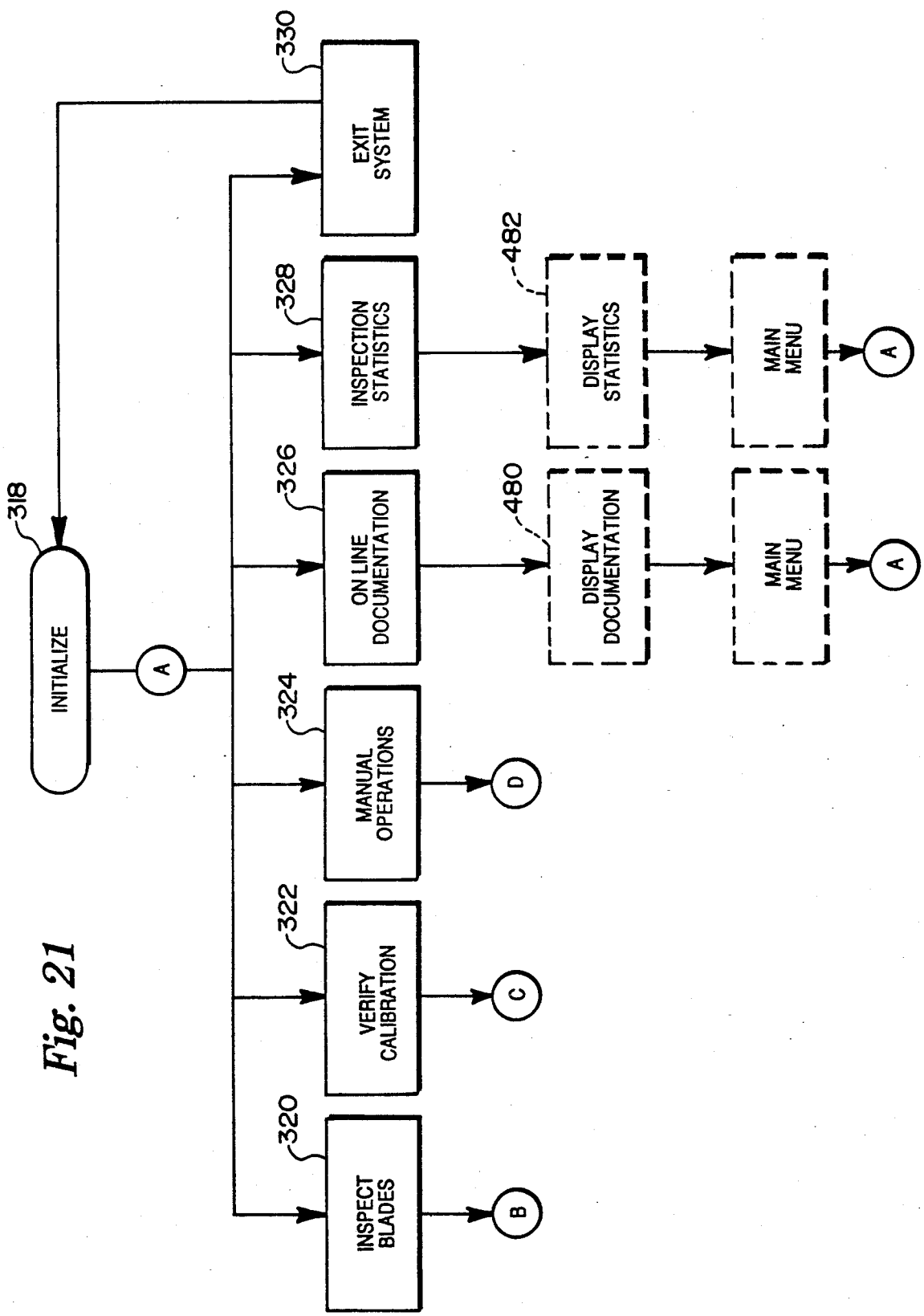
FIG. 21 is a schematic diagram depicting the touch screen options presented to the operator upon initialization of the system, with certain follow on operations depicted in phantom lines.
Figure 22:
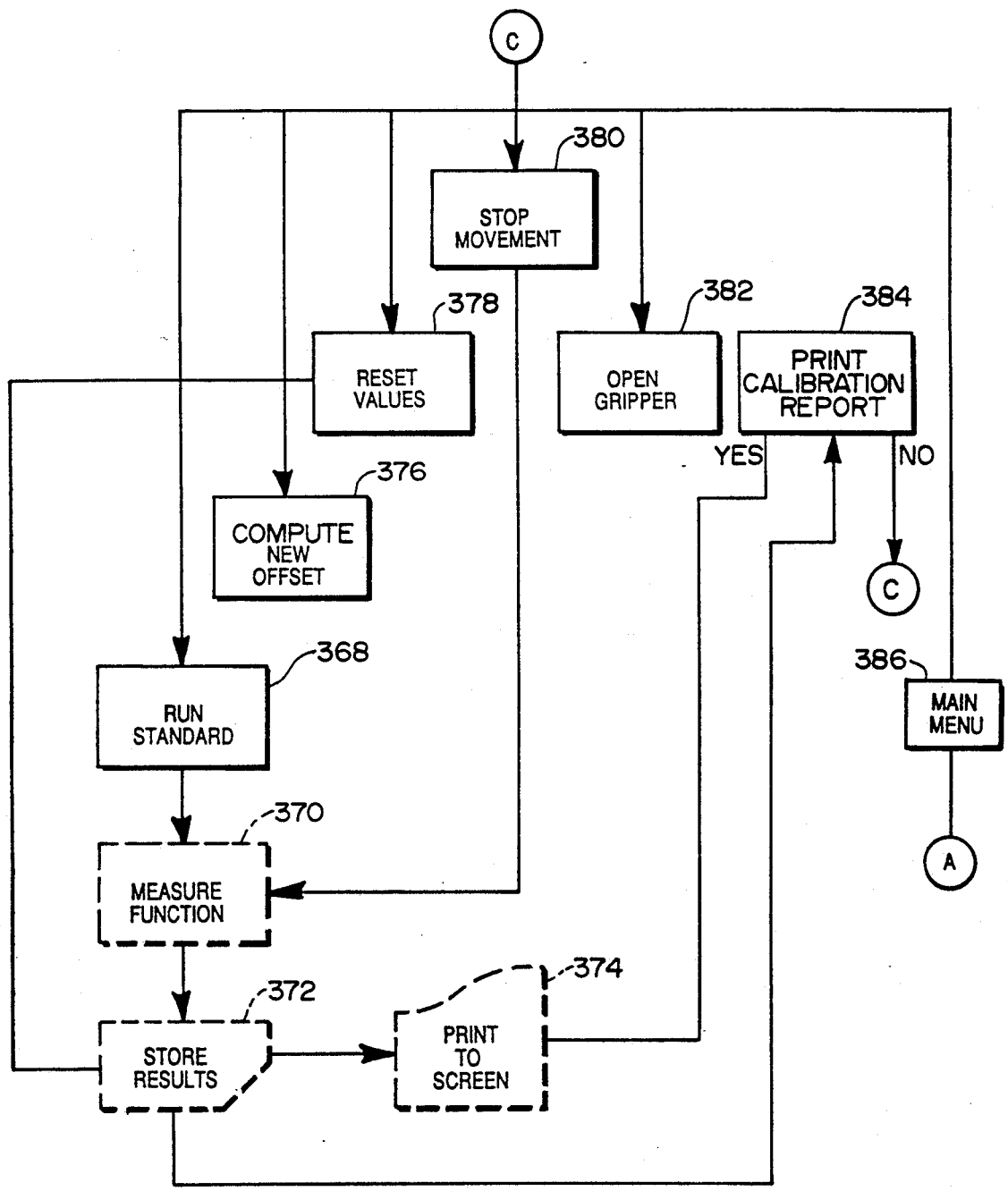
FIG. 22 is a schematic diagram depicting the touch screen options presented to the operator upon selection of the verify calibration option of FIG. 21, with certain follow on operations depicted in phantom lines.

Operation of the apparatus 30 for inspecting turbojet engine blades is broadly depicted by the flow diagram of FIG. 20. Power is provided to the apparatus at block 300 of FIG. 20. The blade inspection assembly 38 then automatically proceeds to a predesignated "home" position in both the linear and rotary orientations at block 302. To orient itself along the linear axis, the carrier block 54 is moved upwardly to a position detected by upper limit position sensor 66. To orient itself in the rotary position, the rotary table 72 orients itself to a predetermined angular position sensed by magnetic sensor 78.

The next step in the operation of the apparatus 30 is for the operator to choose whether the paint marker 44 is to be actuated or not (block 304). Calibration of the system may then take place at block 306. After verification of calibration, the operator will input the type of blade to be inspected at block 308, and operation will proceed to the inspect blade function 310. After a blade is inspected, a decision as to whether the results of the inspection should be printed is made at block 312. A yes decision will cause actuation of the printer 314. The program will then determine whether a repeat of the inspection of the same type blade is desired at block 316.

Figure 23:
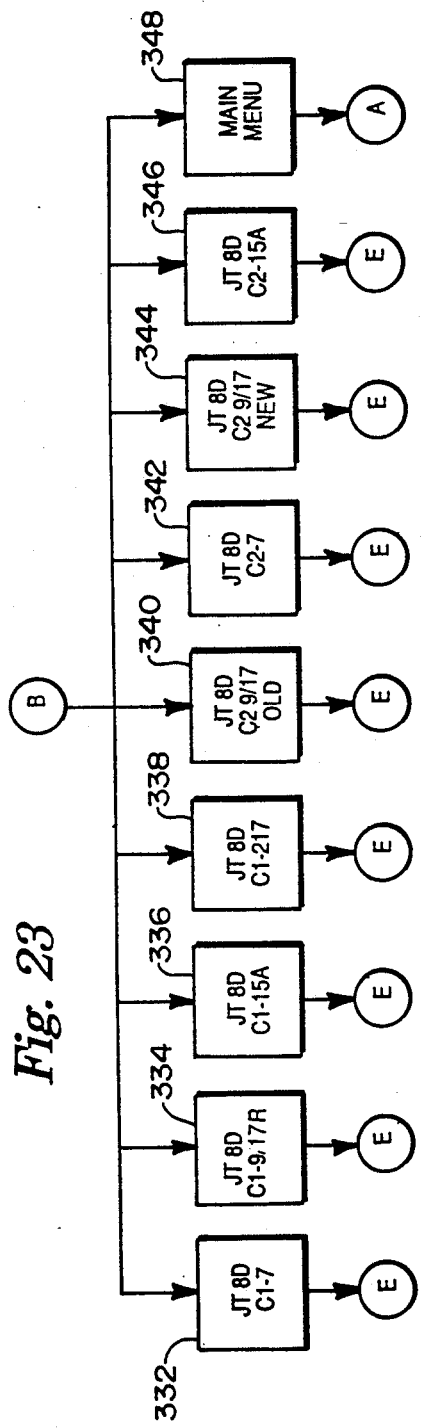
FIG. 23 is a schematic diagram depicting the touch screen blade type options presented to the operator upon selection of the inspect blade option of FIG. 21.

The operational flow of the apparatus 30 can be understood in more detail with reference to the touch screen displays presented to the operator and depicted in schematic form in FIGS. 21-25. Upon energizing the apparatus 30 at the initialize step 318, the laser scanners are turned on, variables within the system are set to their initial values, and the apparatus 30 is made generally ready to conduct blade inspections. After initialization, the operator is presented with a selection of operations to be carried out as represented by blocks 320-330. Upon selection of the inspect blade function block 320, the operator is prompted to input the type of engine blade to be inspected, as depicted in FIG. 23. Blocks 332-346 of FIG. 23 represent a standard set of choices available to the operator for conventional turbojet engine blade types, it being understood that parameters for other blade types could be easily programmed into the system. The operator is also presented with the opportunity to return to the main menu at block 348.

Figure 24:
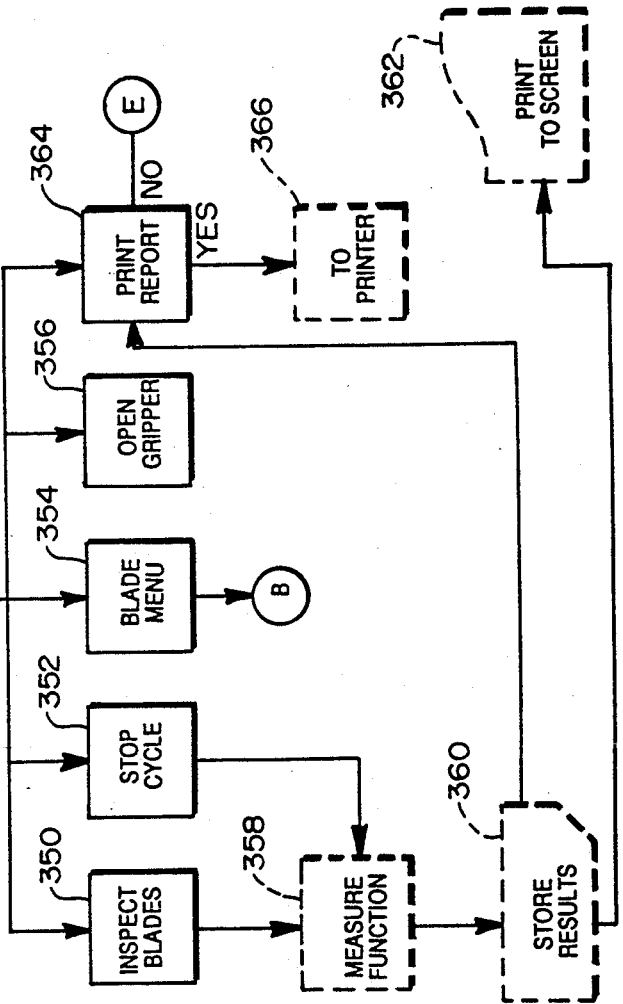
FIG. 24 is a schematic diagram depicting the touch screen options presented to the operator upon selection of one of the blade types presented in FIG. 23, with certain follow on operations depicted in phantom lines.
Figure 25:
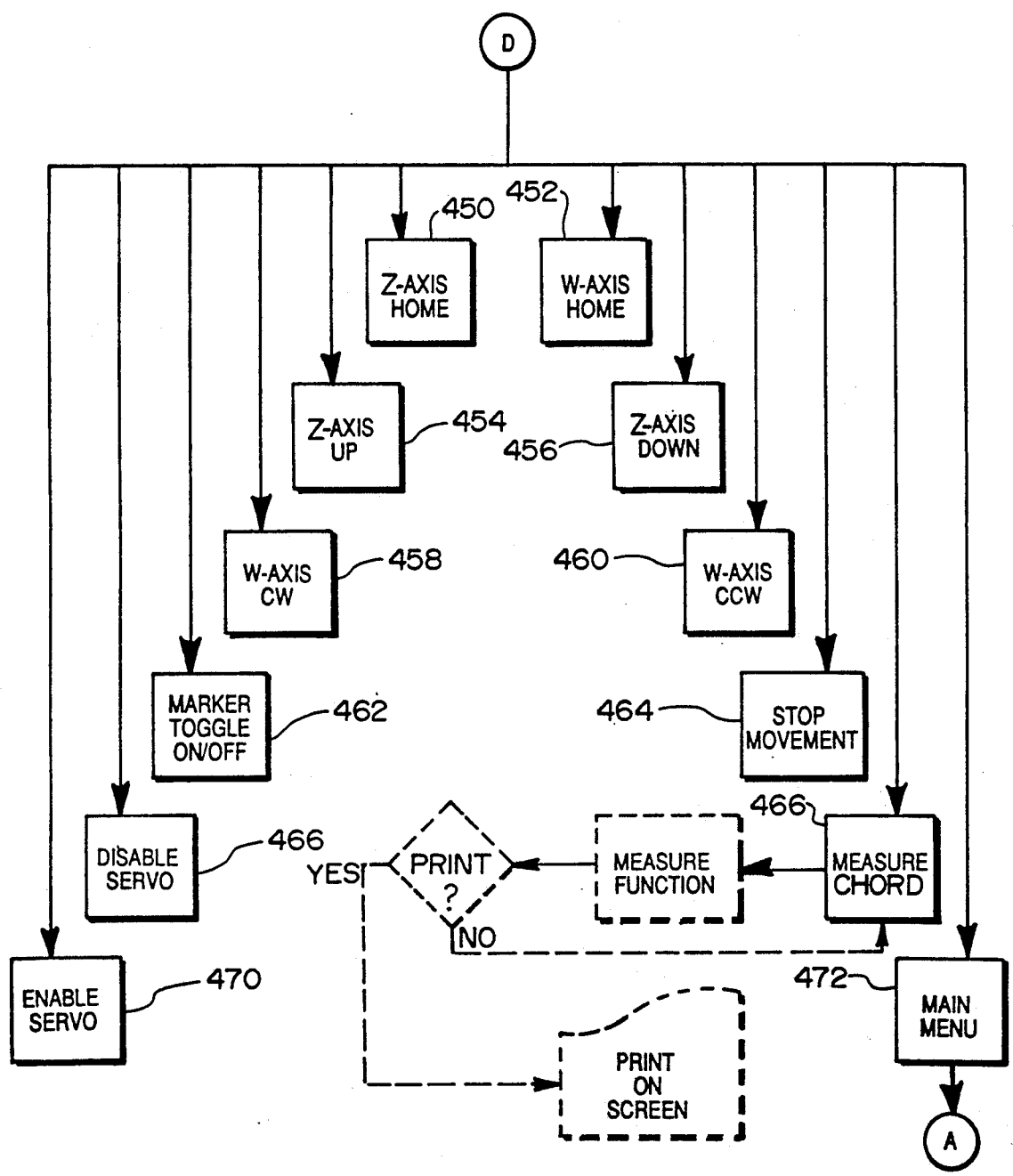
FIG. 25 is a schematic diagram depicting of the touch screen options presented to the operator upon selection of the manual operation option of FIG. 21, with certain follow on operations depicted in phantom lines.

After selection of the engine blade type (FIG. 23), the operator is presented with the function selections of blocks 350-356 (FIG. 24). In particular, the operator can select the inspect blade function at 350 whereupon the machine automatically proceeds to the measure function operation of block 358, to be described in detail below. Upon completion of the measure function operation 358, the results of the inspection are stored at block 360 and printed either to the screen (block 362) or a printer (block 364, 366), as designated by the operator.

Still referring to FIG. 24, the operator is provided with an operator override option at block 352. Initiation of the stop cycle operation of block 352 will cease all activity by the apparatus 30. The operator is also presented with the opportunity to return to the blade menu (block 354), or to open the gripper assembly (block 356) for blade insertion or retrieval.

Referring back to FIG. 21, the operator has the option of verifying the calibration of the apparatus 30 at block 322. Selection of the verify operation of block 322 will present the operator with the options depicted in FIG. 22. Selection at FIG. 22 of the run standard function (block 368) will cause the apparatus 30 to do a measurement run on a standard calibration blade (not shown) that can be inserted by the operator. The calibration device is measured at block 370, with the results of the calibration measurement stored at block 372 and printed at block 374. Assuming a standard deviation is detected during the run standard function 368, a new offset for the device can be computed by actuating block 376. The operator is given the opportunity to reset all offset values to zero at block 378. An operator override is provided at block 380 which, when actuated, ceases all functioning of the apparatus 30. The open gripper function 382 allows for insertion and retrieval of the calibration blade from the gripper assembly. A printed calibration report is provided by actuating the print calibration function of block 384. The calibration report can provide information as to the results of a particular calibration run, and the number of times the apparatus 30 has been calibrated over a given time frame. Finally, the operator is provided with the opportunity to return to the main menu at block 386.

Figure 26:
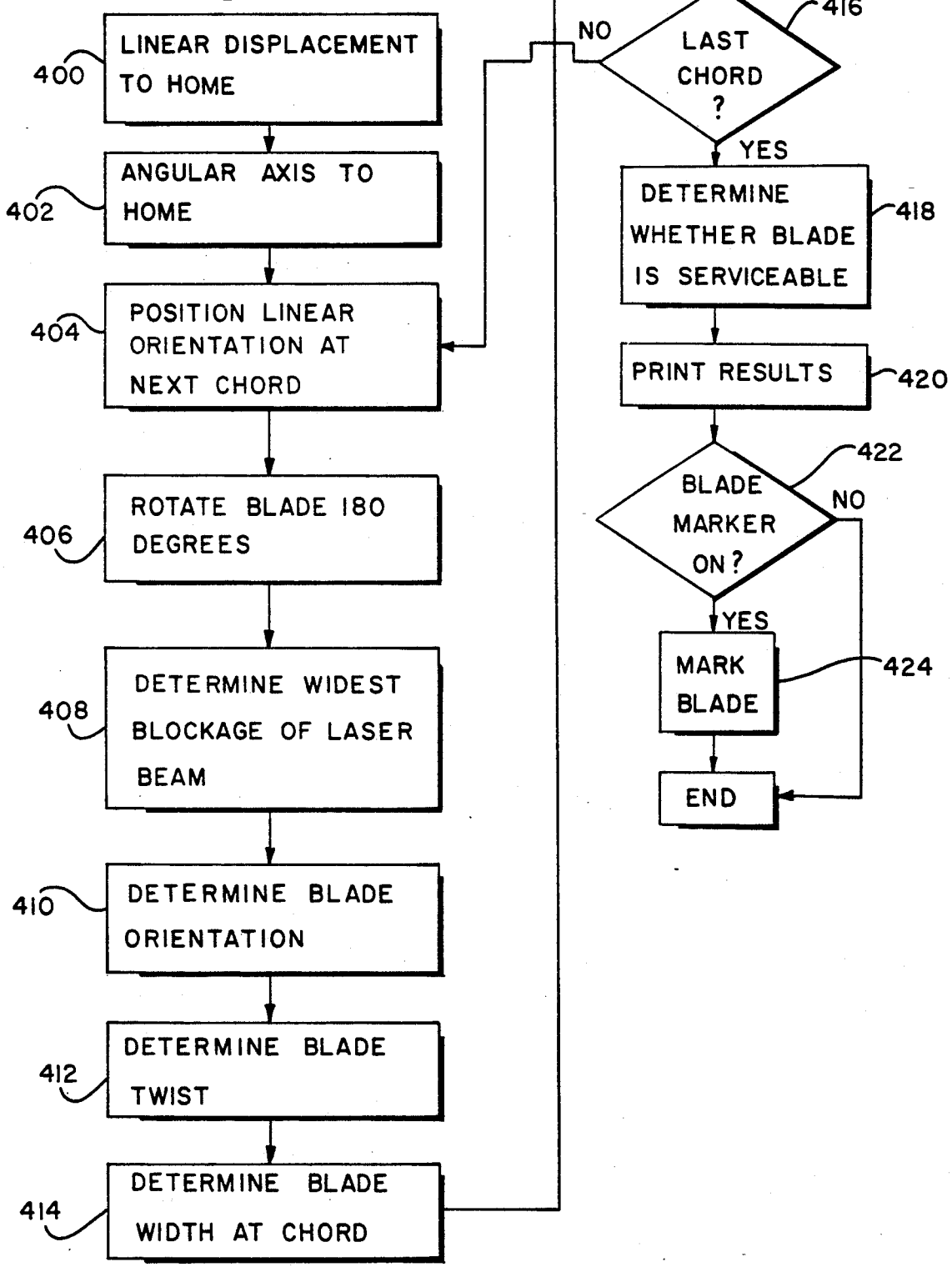
FIG. 26 is a flow diagram depicting the operation sequence employed by the apparatus for inspecting blades during the measure function operation.

The measure function operation is depicted in detail in FIG. 26. At block 400, the elevation control assembly 46 positions the blade to the home position. In particular, the blade mounting assembly 40 is positioned as depicted in FIG. 11, with the blade root oriented just below the laser scanning beams 241, 243. Program flow then proceeds to block 402 where the angular axis is oriented to home. In particular, the angular orientation of the rotary table 72 is positioned in a predetermined angular orientation as sensed by sensor 78. Program flow then proceeds to block 404 where the blade is positioned for the first measurement of blade chord width (the blade chord at the selected blade elevation) within the laser scanning beam. Program flow then proceeds to block 406 where the blade is rotated 180°.

After rotating the blade 180° at block 406, the program determines what the widest blockage of the laser beams 241, 243 was during the rotation at block 408. The program then proceeds to block 410 where it is determined what the angular position of the blade was at the point of widest blockage of the laser beam. Program flow then proceeds to block 412 where the angular orientation of the blade determined in block 410 can be compared to the predetermined standard angular orientation of the standard blade at the particular blade chord being analyzed. The deviation between the measured angular orientation and the standard blade orientation provides a measure of blade twist. Program flow then proceeds to block 414 for a determination of the blade width.

After determination of blade width and blade twist at a particular blade chord, program flow proceeds to decision block 416 where it is determined whether the measured blade chord was the last chord to be measured on the blade. If there are more chords to be measured, program flow proceeds back to block 404, where the elevation control assembly 46 of the apparatus 30 lowers the blade being measured to position the next chord to be measured within the laser scanning beams 241, 243. When blade width has been determined along the entire length of the blade, the program flow proceeds from decision block 416 to block 418 where a determination of whether the blade is serviceable or unserviceable is made by the program. The decision is made by comparing the measured blade parameters against standard parameters published by the FAA and blade manufacturers. Program flow then proceeds to block 420 for printing the results of the inspection. Program flow then proceeds to decision block 422 where it is determined whether the blade marker function has been actuated. If the blade marker function has been actuated, program flow proceeds to block 424 where the blade is marked with the paint marker assembly 44. In that regard, the blade is raised by the elevation control assembly 46 to orient the substandard portions of the blade with the paint marker for marking.

Referring again back to FIG. 21, the operator has the option of manually operating the apparatus 30 rather than having the apparatus 30 automatically step through each of the functions required to inspect a blade. Upon selection of the manual operations function at block 324, the touch screen presents the operator with the options schematically depicted in FIG. 25. Actuation by the operator of the z-axis home function 450 will orient the blade mounting assembly 40 in the axial home position. Orientation of the w-axis home function 452 by the operator will orient the blade mounting assembly 40 in its angular home position. The operator can move the blade mounting assembly either up or down by actuating the z-axis up function 454 or the z-axis down function 456. The operator can rotate the blade mounting assembly either clockwise or counterclockwise by actuating the w-axis cw function 458 or w-axis ccw function 460. The paint marker assembly 44 can be manually actuated by the operator through the marker toggle on/off function block 462, and an operator override can be actuated by selecting the stop movement function 464. The width of a blade at a particular chord selected by the operator can be initiated by selecting the measure chord function 466. The motor drives to the blade mounting assembly 40 can be disabled and enabled by selection of functions 468 and 470. The operator can return to the main menu by selecting function 472.

Referring back to FIG. 21, selection of the online documentation function 326 by the operator provides the operator with a "help" screen function that describes, in the display documentation block 480, the various operations of the apparatus 30. Selection by the operator of the inspection statistics function 328 will present the operator, at the display statistics block 42, with inspection statistics such as number of blades inspected, number of blades passing inspection, number of times calibration has been carried out on the machine, etc. Shutdown of the system is initiated by the selection of the exit system function 330.

The mechanical operation of the blade engaging assembly 52 can be understood with reference to FIGS. 8-10. Any of the three types of blade gripper assemblies 84 (FIG. 5), 182 (FIG. 15), or 202 (FIG. 18) can be received by the adaptor assembly 86. In particular, the stepped keys 129, 129', 206 of the respective gripper assemblies 84, 182, 202, are receivable within the keyways 116 of the adaptor assembly locking ring 94. Loosening of the locking ring 94 allows for insertion of the keys and reception of the gripper assembly base portions within cavity 101 of the adaptor cap portion 100. The locking ring 94 can then be tightened down to securely couple the gripper assembly to the adaptor assembly.

Pressurized air can be selectively introduced into the cylinder portion 104 of adaptor assembly 86 through channel 105 to urge the piston 96 upwardly. The upward motion of the piston 96 in turn urges the pusher block 130 of gripper assembly 84 upwardly, against the biasing force of springs 142, 144. Referring to FIGS. 9 and 10, the gripper jaws 132, 134, are fixedly coupled to the pusher block 130, and are in turn urged upwardly relative to the horizontal bar 120 of key bar 118. The size of the gripping channel 177 is accordingly increased, so as to allow for the manual insertion of the blade root 158 of blade 146 into the gripping channel (see FIG. 2). Once the blade is properly positioned within the gripping channel 176, actuating air is removed from the channel 105, and the biasing force of springs 112, 142, and 144 urge the piston 96, pusher block 130, and gripper jaws 132, 134 downwardly to securely engage the blade root 158 within the gripping channel 177.

Insertion of blades into the gripping assembly 182 is accomplished in a similar manner to that described above for the operation of gripping assembly 82. Referring to FIGS. 18 and 19, it will be appreciated that operation of the gripping assembly 202 is likewise similar in that the carriage 220 can be shifted upwardly by actuation of the piston 96 within the adaptor assembly 86. The upward shifting of carriage 220 causes the rod 218 to shift upwardly relative to the blade root receiving cradle 210, allowing the blade feet 194, 196 to be received by the rod 218. Once the blade feet 194, 196 of blade 186 are properly received by rod 118, actuating air is removed from the piston 96 of adaptor assembly 86, and the blade feet 194, 196 are urged downwardly for secure engagement within the blade root receiving cradle 210 of the gripping assembly 202.

We claim:
1. A method for the noncontact inspection of an engine blade, said blade presenting a blade axis, blade twist and blade widths along said axis, including the steps of:
   providing a scanning energy beam;
   measuring the angular orientation of said blade;
   shifting said blade axially through said beam;
   rotating said blade within said beam at predetermined positions along said blade axis, thereby blocking a portion of said energy beam; and
   determining the blade width at said predetermined positions from the size of said blocked portion of said energy beam.

2. The method as claimed in claim 1, including the step of comparing said determined blade widths to predetermined blade width criteria to evaluate whether said blade is serviceable.

3. The method as claimed in claim 1, including the step of measuring the angular orientation of said blade and comparing said measured angular orientation to a predetermined standard angular orientation of a standard blade, whereby the deviation between said measured angular orientation and said standard blade orientation provides a measure of blade twist for said blade.

4. The method as claimed in claim 3, including the step of comparing said blade twist for said blade to predetermined blade twist criteria to evaluate whether said blade is serviceable.

5. An apparatus for the noncontact inspection of an engine blade, said blade presenting physical dimensions including a longitudinal axis, comprising:
   scanning means for presenting an energy beam;
   blade engagement means for operably engaging and releasably holding said blade;
   axial motion means for causing relative motion between said energy beam and said blade along said axis;
   rotational motion means for causing relative motion between said energy beam and said blade about said axis; and
   processing means, operably coupled to said scanning means, said axial motion means and said rotational motion means, for determining said physical dimensions.

6. The invention as claimed in claim 5, said scanning means including means for transmitting said energy beam and means for receiving said energy beam, said axial motion means and said rotational motion means including means for positioning said blade within said beam interposed between said transmitting means and said receiving means.

7. The invention as claimed in claim 6, said scanning means comprising a laser scanning device, said energy beam comprising a generally planar laser beam.

8. The invention as claimed in claim 5, said blade comprising a turbojet engine blade having a blade root, said blade engagement means being operably coupled to said axial motion means and said rotational means for operably engaging said blade root.

9. The invention as claimed in claim 8, said apparatus being adapted for inspecting a variety of blades each having a different blade design, said blade engagement means including detachable gripper means for operably gripping said blade, and adapter means for selectively receiving said gripper means whereby said adapter means can receive a variety of gripper means each adapted for gripping a different one of said different blade designs, said adapter means operably coupled to said rotational motion means.

10. The invention as claimed in claim 5, said physical dimensions including blade width and blade twist, said processing means including means for determining said blade width and said blade twist.

11. The invention as claimed in claim 5, including marking means for selectively marking said blade at positions selected by said processing means.

12. The invention as claimed in claim 9, said gripper means comprising:

a generally central bar having a blade root engaging surface and support standards extending therefrom, each said support standard terminating at a pedestal having a stepped key;

two opposed gripping jaws, each jaw having a blade root contacting area;

a pusher block means for carrying said jaws, said block means being slidably received between said support standards; and spring means for biasing said pusher block, whereby said blade root contacting area of each jaw is biased toward said blade root engaging surface to form a gripping channel complementary to a blade root.

13. The invention as claimed in claim 12, said gripper means including a stop wall carried by said central bar adjacent said blade root engaging surface.

14. The invention as claimed in claim 9, said gripper means comprising:

a base having stepped key means for being received by said adapter means and cradle means for receiving a blade root, said cradle means comprising a flat central face and a pair of opposed walls with opposed inner faces tapering upwardly and outwardly away from said central face; and a carriage movably carried by said base, said carriage including a base block vertically oriented relative to said base, a pair of links carried by said base block, said links being generally parallel to and outside said walls of said cradle means, and a blade root engaging rod extending from said base block generally between said walls, whereby said rod is movable toward and away from said central face of said cradle means.

15. The invention as claimed in claim 9, said adapter means comprising:

a support canister fixedly attached to said rotational motion means;

an adapter head secured to said canister and including a cap portion and a cylinder portion, said cap portion being externally threaded and having a cavity for receiving said gripper means;

a locking ring internally threaded for mating with said externally threaded cap portion and including a central aperture and opposed keyways; and piston means for acting on said gripper means received in said cavity, said piston means carried by said adapter head.

16. The invention as claimed in claim 15, said gripper means comprising:

a generally central bar having a blade root engaging surface and support standards extending therefrom, each said support standard terminating at a pedestal having a stepped key;

two opposed gripping jaws, each jaw having a blade root contacting area;

a pusher block means for carrying said jaws, said block means being slidably received between said support standards; and spring means for biasing said pusher block, whereby said blade root contacting area of each jaw is biased toward said blade root engaging surface to form a gripping channel complementary to a blade root.

17. The invention as claimed in claim 16, said gripper means including a stop wall carried by said central bar adjacent said blade root engaging surface.

18. The invention as claimed in claim 15, said gripper means comprising:

a generally central bar having a blade root engaging surface and support standards extending therefrom, each said support standard terminating at a pedestal having a stepped key;

two opposed gripping jaws, each jaw having a blade root contacting area;

a pusher block means for carrying said jaws, said block means being slidably received between said support standards; and spring means for biasing said pusher block, whereby said blade root contacting area of each jaw is biased toward said blade root engaging surface to form a gripping channel complementary to a blade root.

* * * * *